United States Patent
Zangenehpour et al.

(10) Patent No.: US 11,232,310 B2
(45) Date of Patent: Jan. 25, 2022

(54) APPARATUS AND METHOD FOR DETECTING, CLASSIFYING AND TRACKING ROAD USERS ON FRAMES OF VIDEO DATA

(71) Applicants: Sohail Zangenehpour, Beaconsfield (CA); Luis Miranda-Moreno, Outremont (CA); Chiasen Chung, Waterloo (CA); James Clark, Westmount (CA); Liqiang Ding, Montreal (CA)

(72) Inventors: Sohail Zangenehpour, Beaconsfield (CA); Luis Miranda-Moreno, Outremont (CA); Chiasen Chung, Waterloo (CA); James Clark, Westmount (CA); Liqiang Ding, Montreal (CA)

(73) Assignee: TRANSOFT SOLUTIONS (ITS) INC., Waterloo (CA)

(*) Notice: Subject to any disclaimer, the term of this patent is extended or adjusted under 35 U.S.C. 154(b) by 239 days.

(21) Appl. No.: 16/535,547

(22) Filed: Aug. 8, 2019

(65) Prior Publication Data
US 2020/0050870 A1    Feb. 13, 2020

Related U.S. Application Data

(60) Provisional application No. 62/715,866, filed on Aug. 8, 2018.

(51) Int. Cl.
*G06K 9/00* (2006.01)
*G06T 7/246* (2017.01)
(Continued)

(52) U.S. Cl.
CPC .......... *G06K 9/00771* (2013.01); *G06T 7/223* (2017.01); *G06T 7/246* (2017.01);
(Continued)

(58) Field of Classification Search
CPC ......... G06T 7/246; G06T 7/223; G06T 7/285; G06T 7/277; G06T 2207/10016;
(Continued)

(56) References Cited

U.S. PATENT DOCUMENTS 7,227,893 B1 *  6/2007  Srinivasa ........... G06K 9/00771
                                                        348/155
9,443,320 B1 *  9/2016  Gaidon ................ G06K 9/3233
(Continued)

*Primary Examiner* — Carol Wang
(74) *Attorney, Agent, or Firm* — Bereskin & Parr LLP/S.E.N.C.R.L., s.r.l.

(57) ABSTRACT

An apparatus and a method for detecting, classifying and tracking road users on frames of video data are provided. An object detection unit identifies an object in a frame of the video data. A pre-filtering unit determines whether the identifier associated to an object corresponds to another identifier associated to the same object in the same frame of the video data when the identifiers overlap. A tracking unit matches the identified object to a corresponding object in another frame of the video data, such that a path of the sequence of matched objects is tracked throughout the frames of the video data. A scenario unit determines a safety indicator that is a function of the risk indicators indicating interactions between road users.

20 Claims, 9 Drawing Sheets

(51) Int. Cl.
*G06T 7/223* (2017.01)
*G06T 7/285* (2017.01)
*G06T 7/277* (2017.01)

(52) U.S. Cl.
CPC .............. *G06T 7/277* (2017.01); *G06T 7/285* (2017.01); *G06T 2207/10016* (2013.01)

(58) Field of Classification Search
CPC ............. G06K 9/00369; G06K 9/3241; G06K 9/00785; G06K 9/00771
See application file for complete search history.

(56) References Cited

U.S. PATENT DOCUMENTS

| | | | |
|---|---|---|---|
| 2010/0045799 A1* | 2/2010 | Lei ........................... | G06T 7/254 348/169 |
| 2011/0116682 A1* | 5/2011 | Wang ........................ | G06T 7/44 382/103 |
| 2011/0133917 A1* | 6/2011 | Zeng .................... | G06K 9/6293 340/436 |
| 2014/0211988 A1* | 7/2014 | Fan ......................... | G06T 7/248 382/103 |
| 2015/0071487 A1* | 3/2015 | Sheng ................ | G06K 9/00013 382/103 |
| 2016/0171311 A1* | 6/2016 | Case .................. | G06K 9/00771 382/103 |
| 2016/0171852 A1* | 6/2016 | Lin .................... | G06K 9/00771 382/103 |
| 2017/0061229 A1* | 3/2017 | Rastgar .............. | G06K 9/00771 |
| 2017/0344855 A1* | 11/2017 | Mande ............... | G06K 9/00785 |
| 2018/0047193 A1* | 2/2018 | Gao ........................ | G06T 7/248 |
| 2018/0253973 A1* | 9/2018 | Yang ...................... | G08G 1/166 |
| 2019/0130189 A1* | 5/2019 | Zhou .................. | G06K 9/00718 |
| 2019/0294889 A1* | 9/2019 | Sriram ................. | G06K 9/6274 |

\* cited by examiner

APPARATUS AND METHOD FOR DETECTING, CLASSIFYING AND TRACKING ROAD USERS ON FRAMES OF VIDEO DATA

CROSS-REFERENCE TO RELATED PATENT APPLICATION

The application claims the benefit of U.S. Provisional Application No. 62/715,866, filed on Aug. 8, 2018. The complete disclosure of U.S. Provisional Application No. 62/715,866 is incorporated herein by reference.

FIELD OF THE DISCLOSURE

The present disclosure relates to an apparatus and method for detecting, classifying and tracking road users on frames of video data.

BACKGROUND OF THE DISCLOSURE

Pedestrians and cyclists are amongst the most vulnerable road users. Pedestrian and cyclist collisions involving cars result in high injury and fatality rates. For example, safety levels associated with transportation in cities continue to be a problem, with 1.24 million road users being killed in on-road accidents in 2010 globally, and another 20-50 million injured (see Global status report on road safety 2013: Supporting a decade of action, Technical report, World Health Organization). For example, half of the world's road traffic deaths occur among motorcyclists (23%), pedestrians (22%) and cyclists (5%) (see Global status report on road safety 2013: Supporting a decade of action, Technical report, World Health Organization).

Road safety diagnosis traditionally studies historical records of traffic crashes. This practice poses several issues, namely collection of this traffic crash data is expensive, long, and arduous. Furthermore, testing unknown road safety countermeasures presents an ethical dilemma if tested on the general population.

An indirect approach to road safety diagnosis is therefore desired. Surrogate safety analysis is cheaper and significantly faster method of diagnosing road safety issues and addresses concerns with the ethical dilemma of testing road safety countermeasures. It would be desirable to make use of automated traffic data collection using video sensors.

Automated data collection for road users remains a challenge. Due to the constant change of orientation and appearance of pedestrians, cyclists and motor vehicles, detecting and tracking them using video sensors is a difficult task.

Detecting and tracking pedestrian, cyclist and motor vehicle activity on the road such as volumes, speeds, and space-time trajectories can provide valuable insights for improving road safety. Assessment of collision risk between pedestrians, cyclists and automobiles can offer a powerful and informative tool in urban and road planning regimes, and can be leveraged to inform proper placement of improvements and treatment projects to improve road user safety.

SUMMARY OF THE DISCLOSURE

In one example, there is disclosed an apparatus for detecting, classifying and tracking road users on frames of video data, comprising:
an object detection unit that
identifies an object in at least one frame of the video data, wherein the object is identified by finding an identifier associated with the object in the at least one frame, and
determines the class to which the object belongs to among a plurality of predetermined classes;
a pre-filtering unit that determines whether the identifier associated to an object corresponds to another identifier associated to the same object in the same frame of the video data when the identifiers overlap; and
a tracking unit that matches the identified object to a corresponding object in another frame of the video data, such that a path of the sequence of matched objects is tracked throughout the frames of the video data.

For example, the apparatus includes a filtering unit that removes noises and the sequence of matched objects having movements that are less than a predetermined threshold.

For example, the apparatus further includes a scenario unit that determines the path where at least two objects intersect in the at least one frame of the video data.

For example, the scenario unit determines a spatial zone in the at least one frame where the paths of the at least two objects arrive to at least a common point in the at least one frame within a predetermined time of each other.

For example, the scenario unit determines a conflict point where the paths of the at least two objects collide in the spatial zone.

For example, the scenario unit determines a risk indicator associated with an interaction between the at least two objects at the spatial zone and/or conflict point, wherein the risk indicator indicates the risk that the at least two objects interact.

For example, the risk indicator is based on at least one of:
a time between a moment a first object leaves the common spatial zone and
a moment a second object arrives to the common spatial zone;
a speed of one of each of the at least two objects;
an estimated masses of one of the at least two objects;
an angle between velocities of the two objects; and
an arrival order of the at least two objects to the conflict point.

For example, the risk indicator identifies whether the at least two objects collide in the spatial zone or arrive at a common point within a predetermined time of each other in the in the at least one frame of the video data.

For example, the scenario unit determines a safety indicator that is a function of the risk indicators indicating interactions between objects.

For example, the safety indicator comprises a safety curve that represents a cumulative distribution of the risk indicators for all interactions between objects.

For example, an area between the safety curve and 0% defines a safety index.

For example, an area above the safety curve and below 100% defines a risk index.

For example, the identifier associated with the object comprises a bounding box around the object.

For example, the tracking unit determines a speed of an object over the frames of the video data.

For example, a predetermined class comprises at least one of pedestrian, cyclist, motorcyclist, car, bus, truck, and motorized-vehicle.

For example, the object detection unit assigns and classifies bounding boxes around objects in the frames of the video data For example, the bounding box comprises a top coordinate, a bottom coordinate, a left coordinate and a right coordinate in the at least a frame of the video data.

For example, the object detection unit determines a probability that the bounding box belongs to a predicted class of objects.

For example, the pre-filtering unit further determines whether two bounding boxes with the same class have an overlap larger than a predefined threshold to discard one of the bounding boxes.

In one example, there is disclosed a method for detecting, classifying and tracking objects on frames of video data, comprising:
  identifying an object in at least one frame of the video data by finding an identifier associated with the object in the at least one frame;
  determining the class to which the object belongs to among a plurality of predetermined classes;
  determining whether the identified object corresponds to another object with a same class in a same frame of the video data when the identifiers associated to both the object and the another object overlap; and
  matching the identified object to a corresponding object in another frame of the video data, such that a path of the sequence of matched objects is tracked throughout the frames of the video data.

For example, the method further includes removing noises and the sequence of matched objects having movements that are less than a predetermined threshold.

For example, the method further includes determining the path where at least two objects intersect in the at least one frame of the video data.

For example, the method further includes determining a spatial zone in the at least one frame of the video data where the paths of the at least two objects arrive to a common point in the at least one frame within a predetermined time of each other.

For example, the method further includes determining a conflict point where the paths of the at least two objects collide in the spatial zone.

For example, the method further includes determining a risk indicator associated with an interaction between the at least two objects at the spatial zone and/or conflict point, wherein the risk indicator indicates the risk that the at least two objects interact.

For example, the risk indicator is based on at least one of:
  a time between a moment a first object leaves the common spatial zone and
  a moment a second road user arrives to the common spatial zone;
  a speed of one of each of the at least two objects;
  an estimated masses of one of the at least two objects;
  an angle between velocities of the two objects; and
  an arrival order of the at least two objects to the conflict point.

For example, the method further includes identifying whether the at least two objects collide in the spatial zone or arrive at a common point within a predetermined time of each other in the in the at least one frame of the video data.

For example, the identifier associated with the object comprises a bounding box around the object.

For example, the method further includes determining a safety indicator, wherein the safety indicator is a function of the risk indicators indicating interactions between objects.

For example, the safety indicator includes a safety curve that represents a cumulative distribution of the risk indicators for all interactions between objects.

For example, an area between the safety curve and 0% defines a safety index.

For example, an area above the safety curve and below 100% defines a risk index.

For example, the method further includes determining a speed of the object over the frames of the video data.

For example, the predetermined class comprises at least one of pedestrian, cyclist, motorcyclist, car, bus, truck, and motorized-vehicle.

For example, the method further includes assigning and classifying bounding boxes around objects in the frames of the video data.

For example, the bounding box comprises a top coordinate, a bottom coordinate, a left coordinate and a right coordinate in the at least a frame of the video data.

For example, the method further includes determining a probability that the bounding box belongs to a predicted class of objects.

For example, the method further includes determining whether two bounding boxes with the same class have an overlap larger than a predefined threshold to discard one of the bounding boxes.

DETAILED DESCRIPTION OF THE DISCLOSURE

Figure 1:
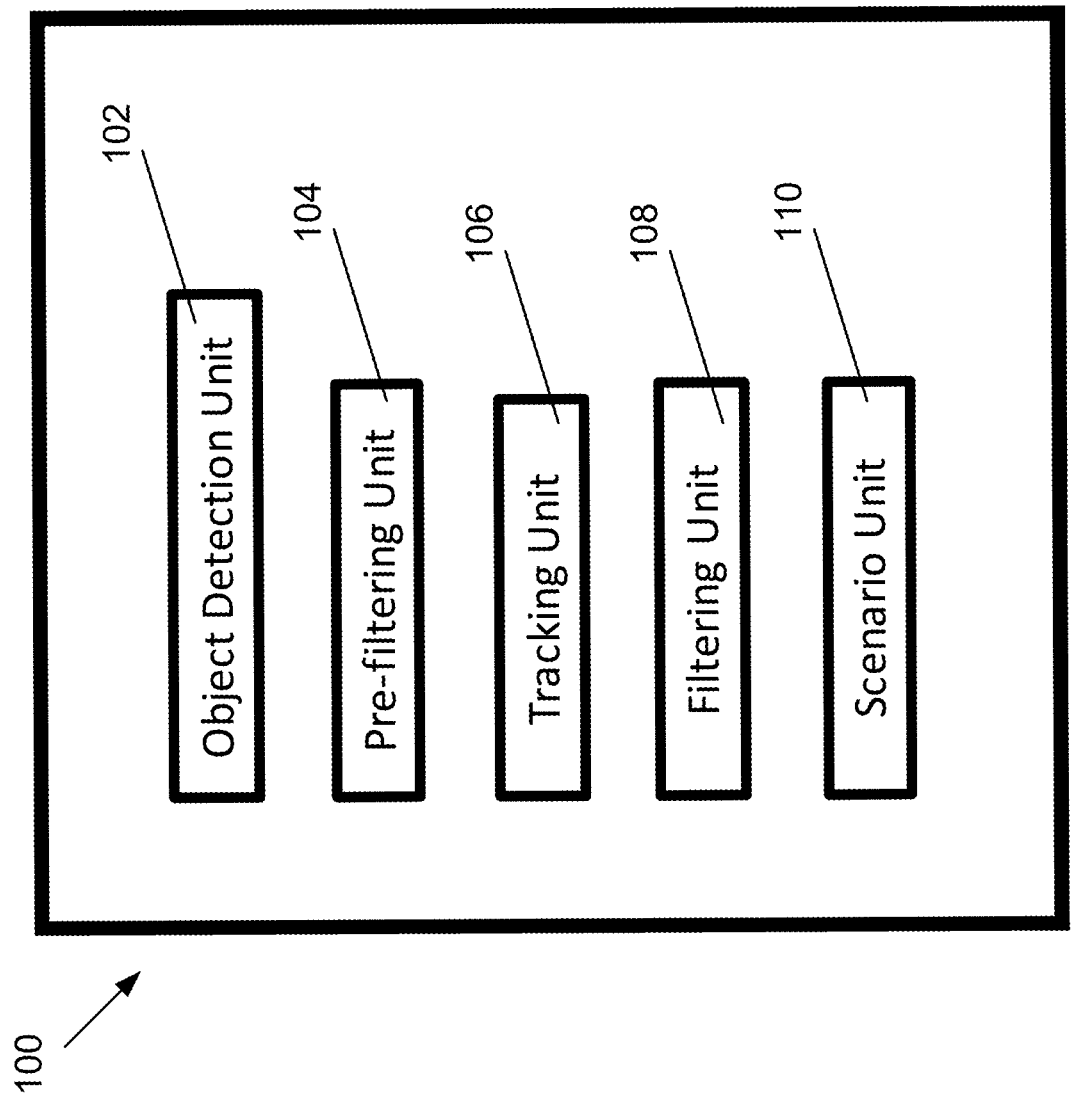
FIG. 1 shows an apparatus for detecting, classifying and tracking road users on frames of video data, according to one example.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems and methods described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present disclosure.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The apparatus and system described herein can include a server platform, which communicates with a plurality of user devices, and a plurality of administrator devices via a communication network. The server platform may be a purpose built machine designed specifically for implementing a system and method for detecting, classifying and tracking road users on frames of video data.

The apparatuses and devices may be a server computer, desktop computer, notebook computer, tablet, PDA, smartphone, or another computing device. They may include a connection with the communication network such as a wired or wireless connection to the Internet. In some cases, the communication network may include other types of computer or telecommunication networks. They may include one or more of a memory, a secondary storage device, a storage unit, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage.

The processor of each of apparatuses and devices described herein may execute applications, computer readable instructions or programs. The applications, computer readable instructions or programs may be stored in memory or in secondary storage, or may be received from the Internet or other communication network. An input device may include any device for entering information into the apparatuses and devices described in the present disclosure. For example, input device may be a keyboard, key pad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, the apparatuses and devices may include multiple of any one or more of processors, applications, software modules, secondary storage devices, network connections, input devices, output devices, and display devices.

There is provided an apparatus for detecting, classifying and tracking road users on frames of video data. Examples of problems solved using this disclosure include, but not limited to: identification and ranking of dangerous sites within a number of monitored sites within a city. This helps best allocate road safety remediation resources to the most impacted locations.

Other examples of problems solved using this disclosure include, but not limited to: conducting before and after road safety studies, including pilot projects of short duration. Assessment of the safety impact of the project can be performed within a short period of time, for example within a month or less. Then, remedial action can be performed on the pilot project immediately and reduce the risk imposed to the public.

Further examples of problems solved using this technology include, but not limited to: conducting large-scale cross-sectional studies of existing infrastructure. These studies can be used to compile knowledge about existing designs and propose amendments to existing road building code.

Furthermore, examples of problems solved using this technology include, but not limited to: continuous monitoring of selected sites observing temporal trends in road safety. This solution notifies transportation agencies of potential road safety issues in real-time.

Referring to FIG. 1, there is provided an apparatus/device 100 for detecting, classifying and tracking road users on frames of video data. The apparatus can be a device, such as a computer device. The apparatus includes an object detection unit 102, a pre-filtering unit 104, a tracking unit 106, a filtering unit 108, and a scenario unit 110.

The object detection unit 102 identifies an object in a frame of the video data. For example, the object is identified by finding an identifier associated with the object in the frame.

Figure 4:
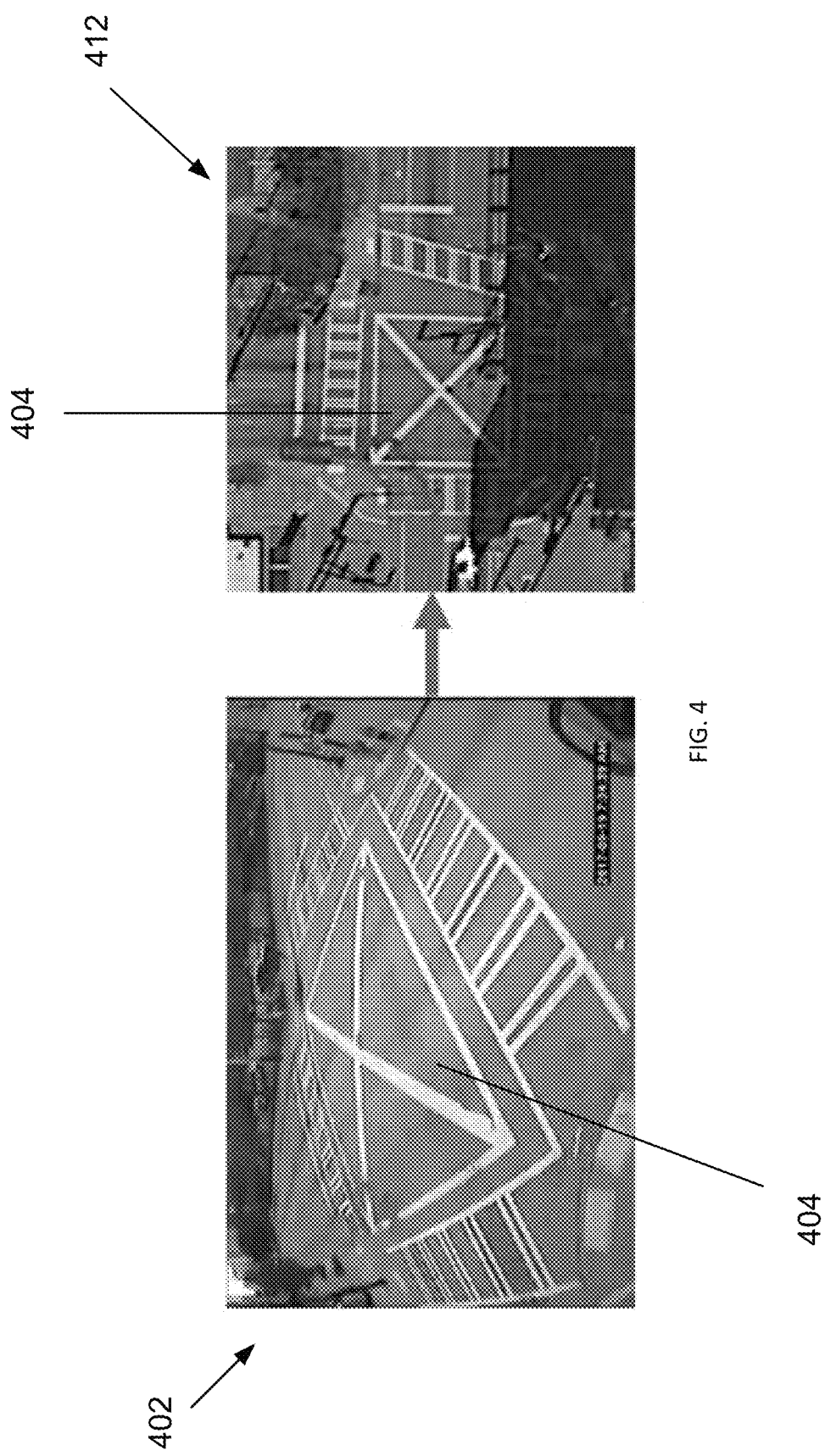
FIG. 4 shows a camera view and satellite view of a street, according to one example.

For example, a camera and satellite views of a street 404 are shown in FIG. 4. For example, the street can include sidewalks, bicycles lanes, parking area, etc. The street 404 may include one or more sensors (such as video cameras, etc.) positioned at different corners to capture the objects (such as pedestrians, automobiles, cyclists, motorcyclists, etc.) in the streets for display, for example, in a remote location. The objects in the street may include static objects that do not change, such as walls, signs, traffic lights, benches, building, etc. Other objects in the street may be semi-static, i.e., they may change slightly. Some objects may be dynamic objects that can change in position and/or configuration, such as pedestrians, automobiles, cyclists, motorcyclists. For example, dynamic objects can be road users.

Referring back to FIG. 1, at each frame the object detection unit 102 identifies an object also determines the class to which the object belongs to among a plurality of predetermined classes. For example, the predetermined class can be a pedestrian class, a cyclist class, a motorcyclist class, a car class, a bus class, a truck class, or a motorized-vehicle class.

The pre-filtering unit 104 can determine whether the identifier associated to an object corresponds to another identifier associated to the same object in the same frame of the video data when the identifiers overlap. For example, the identifier can be a bounding box around the object.

The object detection unit 102 can assign and classify bounding boxes around objects in the frames of the video data. The bounding box can include a top coordinate, a bottom coordinate, a left coordinate and a right coordinate.

The object detection unit 102 can further determine a probability that the bounding box belongs to a predicted class of objects. The pre-filtering unit can also determine whether two bounding boxes with the same class group have an overlap larger than a predefined threshold to discard one of the bounding boxes. For example, Group 1 can include pedestrians, cyclists, and motorcyclists. For example, Group 2 can include cars, buses, trucks and motorized-vehicles.

The tracking unit 106 matches the bounding box around an object to a corresponding bounding box around another object in another frame of the video data, such that a path of the sequence of matched bounding boxes around the objects is tracked throughout the frames of the video data. For example, the tracking unit can determine a speed of the sequence of matched bounding boxes around the objects.

The apparatus 100 can also include a filtering unit 108 that removes noises and sequence of matched bounding boxes around the objects having movements that are less than a predetermined threshold in frames of the video data.

The apparatus can also include a scenario unit 110 that determines the path where at least two road users intersect in the at least one frame of the video data. The scenario unit 110 can determine a spatial zone in the at least one frame where the paths of the at least two road users arrive to at least a common point in the at least one frame within a predetermined time of each other. For example, a spatial zone can be a portion of a road, such as an intersection. For example, spatial zones can be sidewalks, bikes lines, parking spots, corridors or other urban areas. For example, spatial zones can exhibit elevated collision risks to road users, such as pedestrians, cyclists, motorcyclists and automobiles.

The scenario unit 110 can also determine a conflict point where the paths of the at least two road users collide in the spatial zone. The scenario unit 110 can further determine a risk indicator associated with an interaction between the at least two road users at the spatial zone and/or conflict point. The risk indicator can indicate the risk that the at least two road users interact For example, the risk indicator can be based on at least one of: a time between a moment a first road user leaves the common spatial zone and a moment a second road users arrives to the common spatial zone; a speed of one of each of the at least two road users; an estimated masses of one of the at least two road users; an angle between paths and/or velocities of the two road users; and an arrival order of the at least two road users to the conflict point.

The risk indicator can identify whether two road users can collide in the spatial zone and its severity. The risk indicator can identify whether two road users arrive at a common point within a predetermined time of each other in the frames of the video data.

The scenario unit can determine a safety indicator, wherein the safety indicator is a function of the risk indicators indicating interactions between road users at the spatial zone and/or conflict point. For example, the safety indicator includes a safety curve that represents a cumulative distribution of the risk indicators for all interactions between road users. For example, an area between the safety curve and 0% defines a safety index. For example, an area above the safety curve and below 100% defines a risk index.

In one embodiment, a method for detecting, classifying and tracking road users on frames of video data is provided. The method includes identifying an in at least one frame of the video data by finding an identifier associated with the object in the frame. For example, the identifier can be a bounding box around the object. The bounding box can include a top coordinate, a bottom coordinate, a left coordinate and a right coordinate in the frames of the video data.

The method also includes determining the class to which the object belongs to among a plurality of predetermined classes. A predetermined class can include at least one of pedestrian, cyclist, motorcyclist, car, bus, truck, and motorized-vehicle.

The method also includes determining whether the identifier associated to an object corresponds to another identifier associated to the same object in the same frame of the video data when the identifiers overlap. For example, two bounding boxes with the same class can have an overlap larger than a predefined threshold. In this case, the method can choose to discard one of the bounding boxes.

Figure 2:
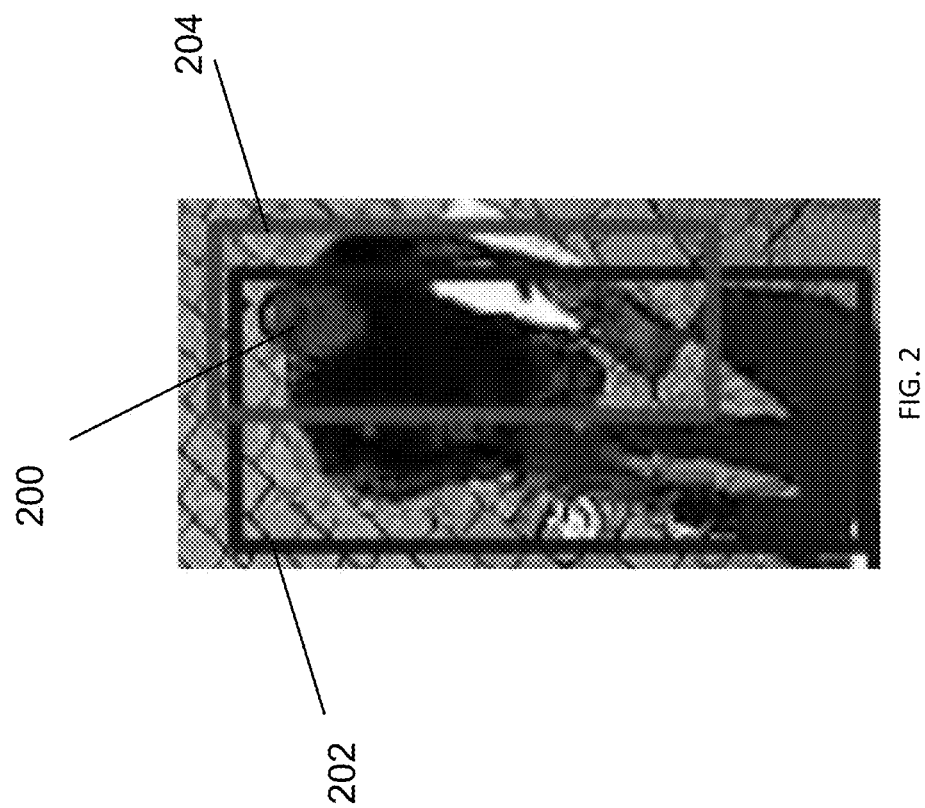
FIG. 2 shows bounding boxes around an object, according to one example.

Referring to FIG. 2, there is shown two bounding boxes 202 and 204 that identifies an object 200. Bounding boxes 202 and 204 overlaps. For example, if two bounding boxes with the same class group have an overlap larger than a predefined threshold, the pre-filtering unit can decide to discard the bounding box with lower probability. In FIG. 2, the smaller bounding box can be removed because of large overlap with the bigger bounding box (the smaller box has lower confidence of belonging to pedestrian class compare to the bigger box). For example, in this image, the red bounding box was removed because of large overlap with the blue bounding box (red box had lower confidence of belonging to pedestrian class compare to the blue box).

The method further includes tracking and matching the identified object to a corresponding object in another frame of the video data, such that a path of the identified object is tracked throughout the frames of the video data.

For example, in addition to the class and the probability (confidence) of the object belonging to a class, a detector unit finds the bounding box around each object. For example, each bounding box (with unique id of k) can have a class, a probability, a top ($T_k$), a bottom ($B_k$), a left ($L_k$) and a right ($R_k$). The probability can be confidence percentage that the bounding box belongs to the predicted class. This step can be done by any detector capable of classifying and detecting bounding box around objects in an image.

Figure 3A:
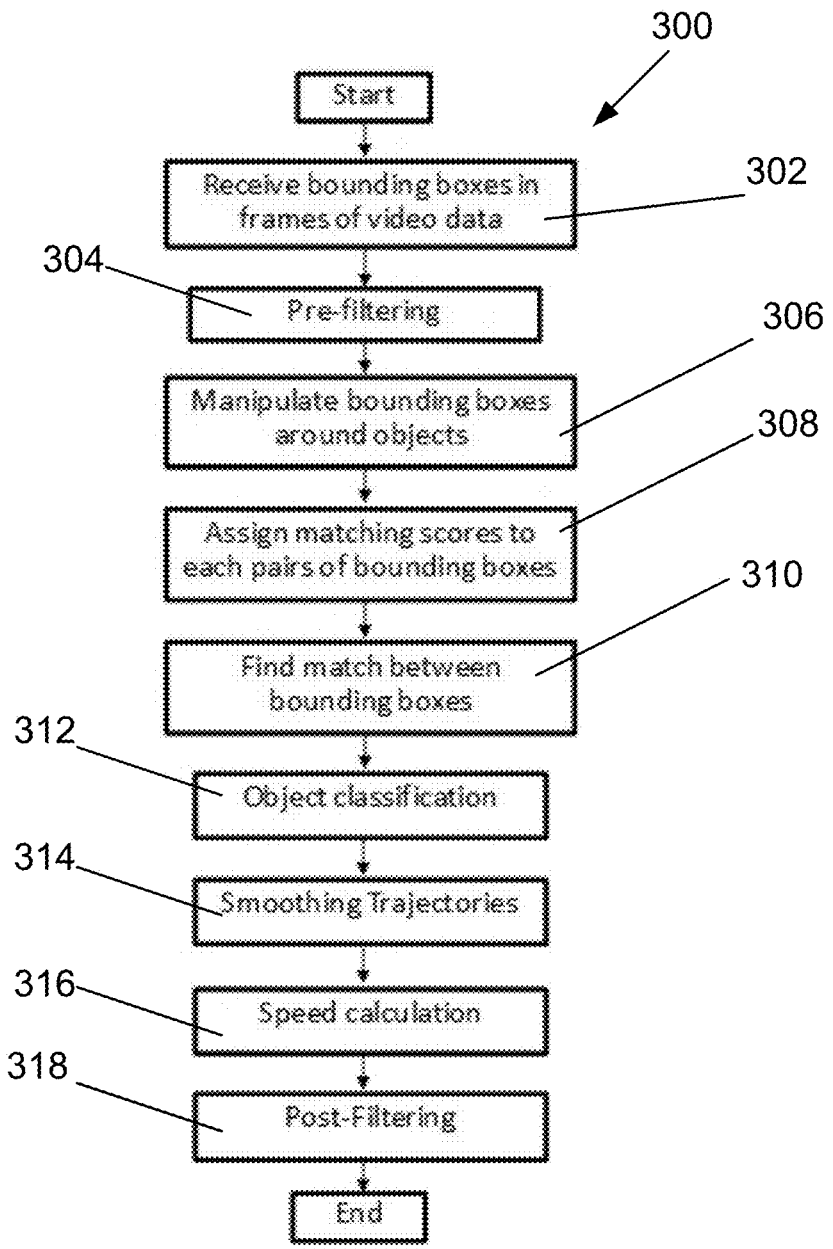
FIGS. 3A and 3B show exemplary embodiments of steps for tracking and matching bounding boxes around objects in frames of video data.

FIG. 3A shows an exemplary embodiment of steps 300 for tracking matching bounding boxes around objects in frames of video data. At 302, the tracking unit receives bounding boxes in frames of the video data. At 304, the tracking unit pre-filters the bounding boxes. At 306, the tracking unit manipulates bounding boxes around objects, such as increases the width of the bounding boxes. At 308, the tracking unit assigns matching scores to each pairs of bounding boxes. At 310, the tracking unit finds a match between bounding boxes. At 312, the objects are classified. Further processing, such as smoothing trajectories 314, speed calculation 316 and post-filtering 318, are also be performed.

Figure 3B:
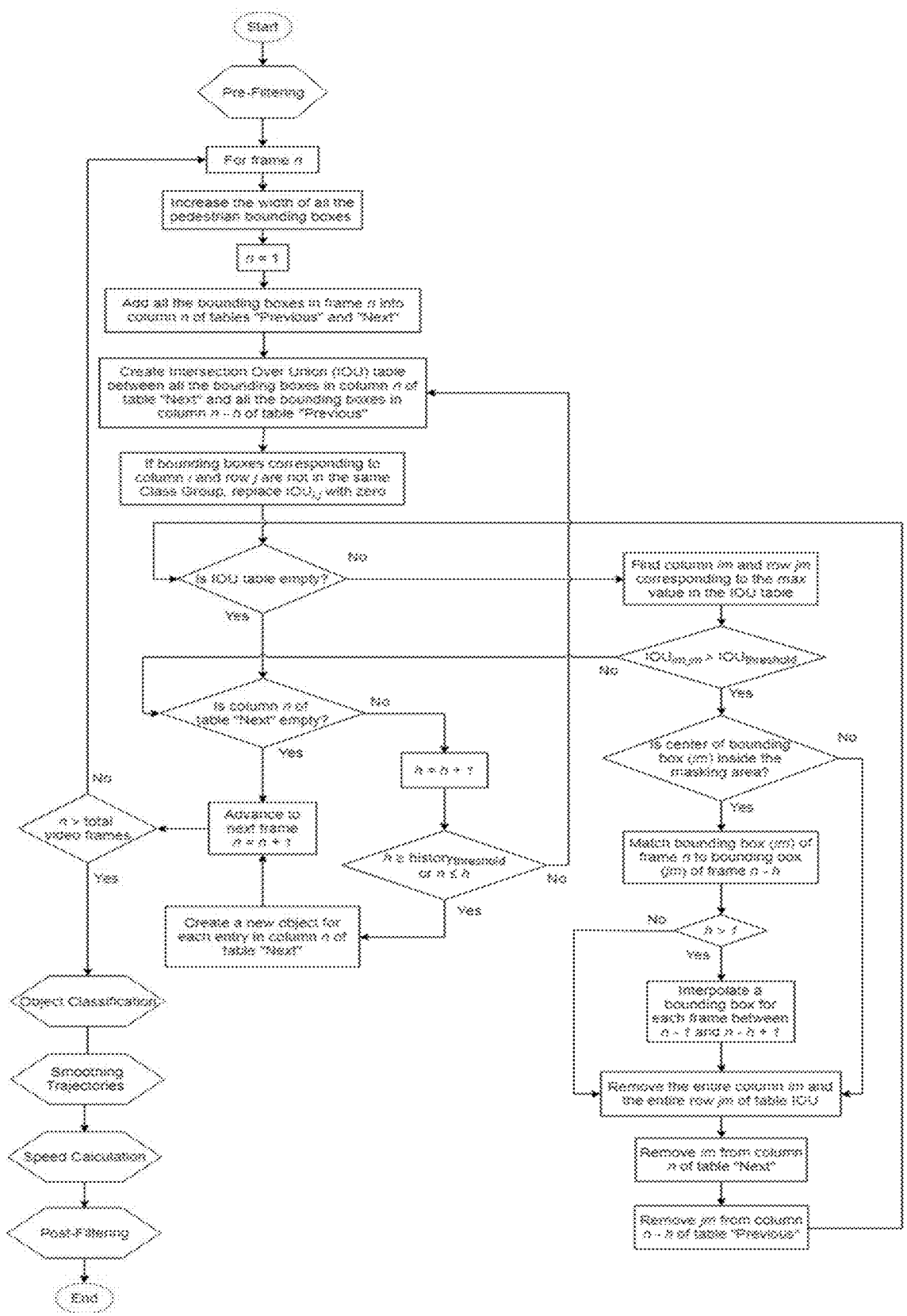

FIG. 3B shows an exemplary embodiment of steps for tracking and matching bounding boxes around objects in frames of video data. First, as input, the tracking unit receives all bounding boxes in all frames of the video data. Each bounding box (with unique id of k) can have a class, a probability, a top ($T_k$), a bottom ($B_k$), a left ($L_k$) and a right ($R_k$).

The tracking unit increases the width of bounding boxes around objects that are classified as pedestrians. As bounding boxes around pedestrians appear to have small width, this will significantly help matching bounding boxes belonging to pedestrians between frames.

The tracking unit assigns matching scores to each pairs of bounding boxes. For example, this matching score can be the Intersection Over Union (IOU). Intersection Over Union between $i^{th}$ and $j^{th}$ bounding box can be determined as follows:

$$IOU_{i,j} = \frac{[\min(R_i, R_j) - \max(L_i, L_j)] * [\min(B_i, B_j) - \max(T_i, T_j)]}{(R_i - L_i)*(B_i - T_i) + (R_j - L_j)*(B_j - T_j) - [\min(R_i, R_j) - \max(L_i, L_j)] * [\min(B_i, B_j) - \max(T_i, T_j)]}$$

Due to possibility of misclassification between objects with similar appearance, at first the tracking unit does not differentiate between bounding boxes around objects within a class group. For example, a class groups can be 1—{pedestrians, cyclists, motorcyclists}, or 2—{cars, buses, trucks, and motorized-vehicles}.

If $i^{th}$ and $j^{th}$ bounding box do not belong to the same class group, $IOU_{i,j}$ will be replaced by zero, meaning the tracking unit does not match two bounding boxes around objects that do not belong to the same class group.

Even if for example a road user is not being detected by the detection unit for x frames, for example for frames between frame number n-x and frame number n, as long as x is not greater than a predefined history threshold, the tracking unit can still match the detected bounding box around the object belonging to the road user in frame number n to the detected bounding box around the object belonging to the road user in frame number n-x.

If the tracking unit finds a match between a bounding box around a road user in frame number n and a bounding box around the same road user in frame number n-x, if x is greater than 1, the tracking unit will interpolate the locations and bounding boxes of the road user for frames between n and n-x. For example, this can be a linear interpolation for frames between frame number n and frame number n-x.

By checking the location of matched bounding boxes against the predefined mask area, the tracking unit makes sure that it is not matching for example a bounding box belonging to a road user that is leaving the video scene to a bounding box belonging to a road user that is entering to the video scene at the same time and same area.

Each bounding box in each frame can be matched to only one bounding box from the previous frames.

For example, in the first step, a sequence of matched objects can be classified into two groups, either group 1 (pedestrian, cyclist, motorcyclist) or group 2 (car, bus, truck, motorized-vehicle). In the second step, the tracking unit decides the final class of each sequence of matched objects.

For example for each sequence of matched objects, the tracking unit sums the probability-classes of the bounding boxes correspond to those objects in each frame (for example in one frame the detection unit classified a bounding box as a pedestrian with probability of 65% and in another frame, the detection unit classified another bounding box that is matched to the previous bounding box as a cyclist with probability of 45%). For example, for a sequence of matched objects:

Sum of probabilities of the bounding boxes classifies as a Pedestrian=1222;
Sum of probabilities of the bounding boxes classifies as a Cyclist=245;
Sum of probabilities of the bounding boxes classifies as a Motorcyclist=51.

The class of the sequence of matched objects is the class that has the highest sum. In the example, the tracking unit will classify the sequence of matched objects as a pedestrian.

To smooth the trajectories of each sequence of matched objects at each frame (frame number n), the tracking unit for each corner (separate for x and y coordinate of the corner):

Get the list of the same corner of bounding boxes belonging to that sequence of matched objects, from frame number n-b to frame number n+b (b is a predefined number, for example fps/2, meaning smoothing over one second)
Sort this list from smallest to largest value;
Remove the top and bottom 25% of the list; and
Compute the mean of the remaining entries.

The trajectory of the sequence of matched objects at each frame can be the center of four corners (top-left, top-right, bottom-left and bottom-right) of its bounding box (after being filtered) at that frame.

For speed calculation, first the tracking unit transforms the points from image space to the real world ground plane. FIG. 4 shows a camera view 402 of an intersection 404 and a satellite view 412 of the same intersection 404. For example, using a homography matrix, the tracking unit can transform the points from image space to the real world ground plane, each point in a camera view {X, Y} (with unit of pixels) can be transformed to real world ground plane coordinate {X', Y'} (for example with unit of meters).

Speed of each sequence of matched objects at each frame (n) will be computed as:

$$\begin{cases} V_{n,x} = (X'_n - X'_{n-1}) * fps \\ V_{n,y} = (Y'_n - Y'_{n-1}) * fps \end{cases}$$
$$\overline{V}_n = \sqrt{V_{n,x}^2 + V_{n,y}^2}$$

Where fps is the frame rate that the video was recorded with.

The tracking unit performs additional steps of Post-Filtering. Depending on the angle and location of the camera and also the direction of movement of traffic, for example a motorcyclist might have the same appearance as a cyclist or even a pedestrian. As a result, the detection unit might for example, misclassify a motorcyclist as a cyclist or a pedestrian.

To reduce the miss-classification between these three classes (pedestrians, cyclists and motorcyclists) that can have similar appearance, their speeds are considered as follow:

For each sequence of matched objects that is classified as a pedestrian or a cyclist, compute the $90^{th}$ percentile speed over all the frames that the object was existed in the video ($\overline{V_{90\%}}$)

If the sequence of matched objects was classified as a pedestrian and if $\overline{V_{90\%}}$ is larger than a predefined threshold (pedestrian speed threshold), then the tracking unit changes the class of the sequence of matched objects from pedestrian to cyclist.

If the sequence of matched objects was classified as a cyclist and if $\overline{V_{90\%}}$ is larger than a predefined threshold (cyclist speed threshold), then the tracking unit changes the class of the sequence of matched objects from cyclist to motorcyclist.

The post-filtering step also includes removing noises and the sequence of matched objects having overall movement of less than a predetermined threshold. For example, removing vehicles that are parked and not moving for a long time.

For example, the post-filtering step can include removing sequence of matched objects that existed in the video for less than a predefined threshold. For example, the threshold can be one of: 0.3 second; 0.5 second; and 0.7 second. It can also include removing sequence of matched objects when their $90^{th}$ percentile speed over all the frames in the video ($\overline{V_{90\%}}$) is:
- less than a predefined threshold if the sequence of matched objects is classified as car or truck or bus or motorcycle; or
- less than a predefined threshold if the sequence of matched objects is classified as pedestrian or cyclist.

The method also includes determining the path where at least two road users intersect in the frames of the video data. The method also includes determining a spatial zone in at least one frame of the video data where the paths of two road users arrive to a common point within a predetermined time of each other.

The method also includes determining a conflict point where the paths of two road users collide in the spatial zone.

The method also includes determining a risk indicator associated with an interaction between the at least two road users. The risk indicator can be based on at least one of: a time between a moment a first road user leaves the common spatial zone and a moment a second road user arrives to the common spatial zone; a speed of one of each of the at least two road users; an estimated masses of one of the at least two road users; the angle between velocities of the two road users at the conflict point; and an arrival order of the at least two road users to the conflict point.

The method also includes identifying whether two road users collide in the spatial zone or arrive at a common point within a predetermined time of each other in the frames of the video data.

The method includes determining a speed of the road users over the frames of the video data. The method also includes assigning and classifying bounding boxes around objects in the frames of the video data. The method further includes determining a probability that the bounding box belongs to a predicted class of object.

The method further includes determining whether two bounding boxes with the same class group have an overlap larger than a predefined threshold to discard one of the bounding boxes.

Figure 5:
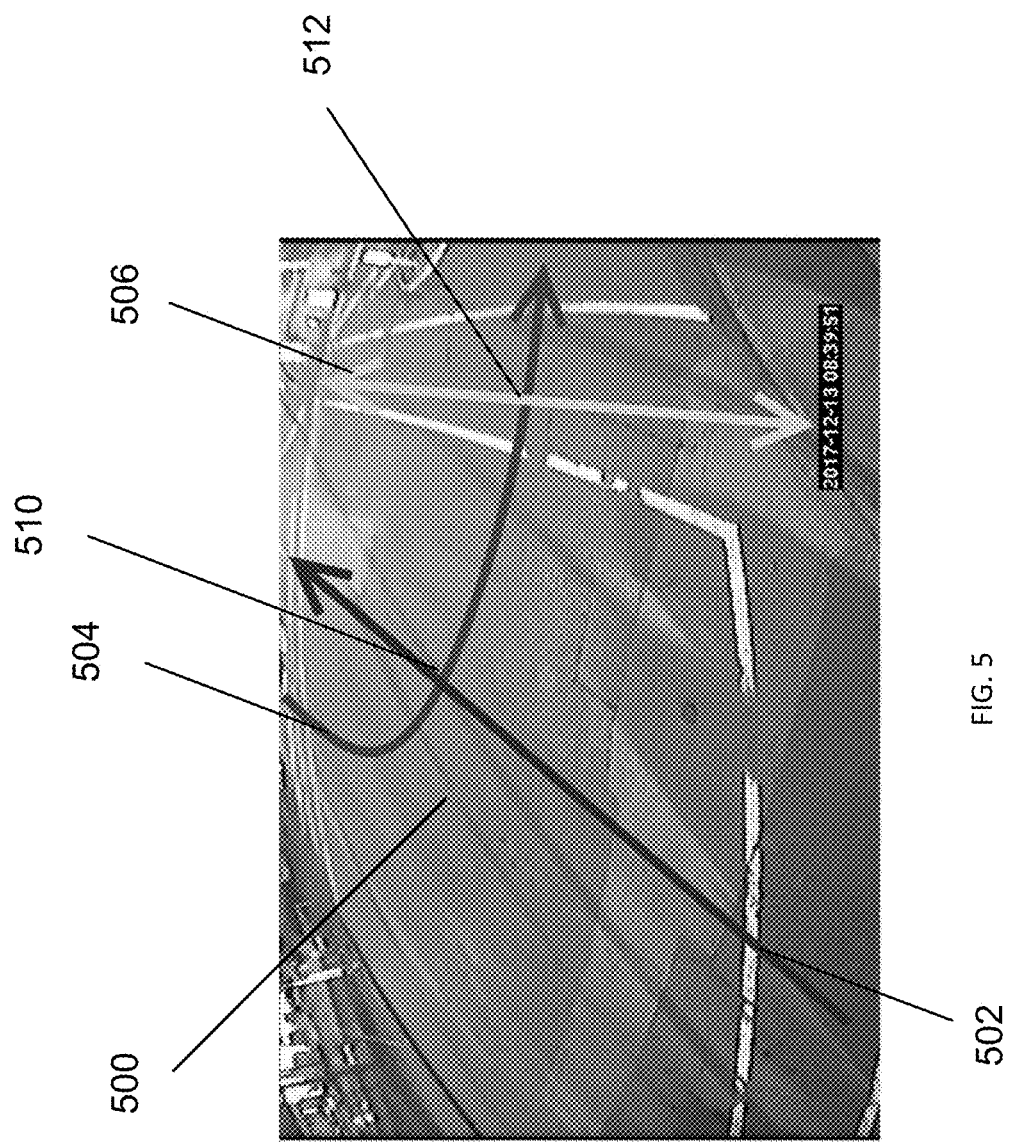
FIG. 5 shows scenarios on road user movements, according to one example.

Referring to FIG. 5, there are shown road user movements 502, 504, 506. For example, a vehicle can follow the road user movement 504 on the road 500. For example, a pedestrian can move on the road 500 according to road user movement 506. As shown, road user movement 502 can collide with road user movement 504 at conflict point 510. Road user movement 504 can collide with road user movement 506 at conflict point 512.

For example, scenarios of interest can be defined for road user movements. For example, a scenario can be defined by selecting two road user movements that can potentially have conflicts with each other, for example:
Left-turning vehicles (road user movement 504) and pedestrians (road user movement 506)
Through vehicles (road user movement 502) and left-turning vehicles (road user movement 504)

An interaction can be defined as a situation where both road user movements in the scenario arrive to the conflict point within a predetermined interval, for example, 10 seconds of each other (PET of less than 10 s). A risk indicator (such as a value or a visual sign) can be assigned to each interaction between the two road users.

For example, this risk indicator can comprise different measures, including:
PET value of the conflict
Speed of each road user at the time of conflict
Estimated masses of the road users involved in the conflict
Angle between velocities of the two road users at the conflict point
Arrival order of the road users to the conflict point Post encroachment time (PET) can be defined as the time between the moment the first road user leaves the common spatial zone (where two road users could potentially collide) and the second road user arrives to the common spatial zone. In other words, the PET value determines how close, in time, the two road users were to colliding. The lower the PET, the more dangerous the conflict.

Depending on which road user arrives to the conflict point first (assuming everything else is the same), the severity of a conflict can significantly vary. For example:
In a vehicle—pedestrian conflict, a situation where the pedestrian arrives to the conflict point first (the vehicle potentially hits the pedestrian) is more dangerous compared to a situation where the vehicle arrives first (the pedestrian potentially hits the vehicle).
In a through vehicle—left turning vehicle conflict where the through vehicles have the right of way, a situation in which the left turning vehicle arrives to the conflict point first is significantly more dangerous.

For example, we combine the PET value and the arrival order together to generate PET&Arrival_Component X is defined based on which road user arrives to the conflict point first:
$X=\sqrt{\beta}$ if road user #1 arrives to the conflict point first
$X=1/\sqrt{\beta}$ road user #2 arrives to the conflict point first
$\beta$ is a predefined parameter which adjusts X based on which arrival situation is more dangerous and can be set differently for each conflict scenario.

Figure 6:
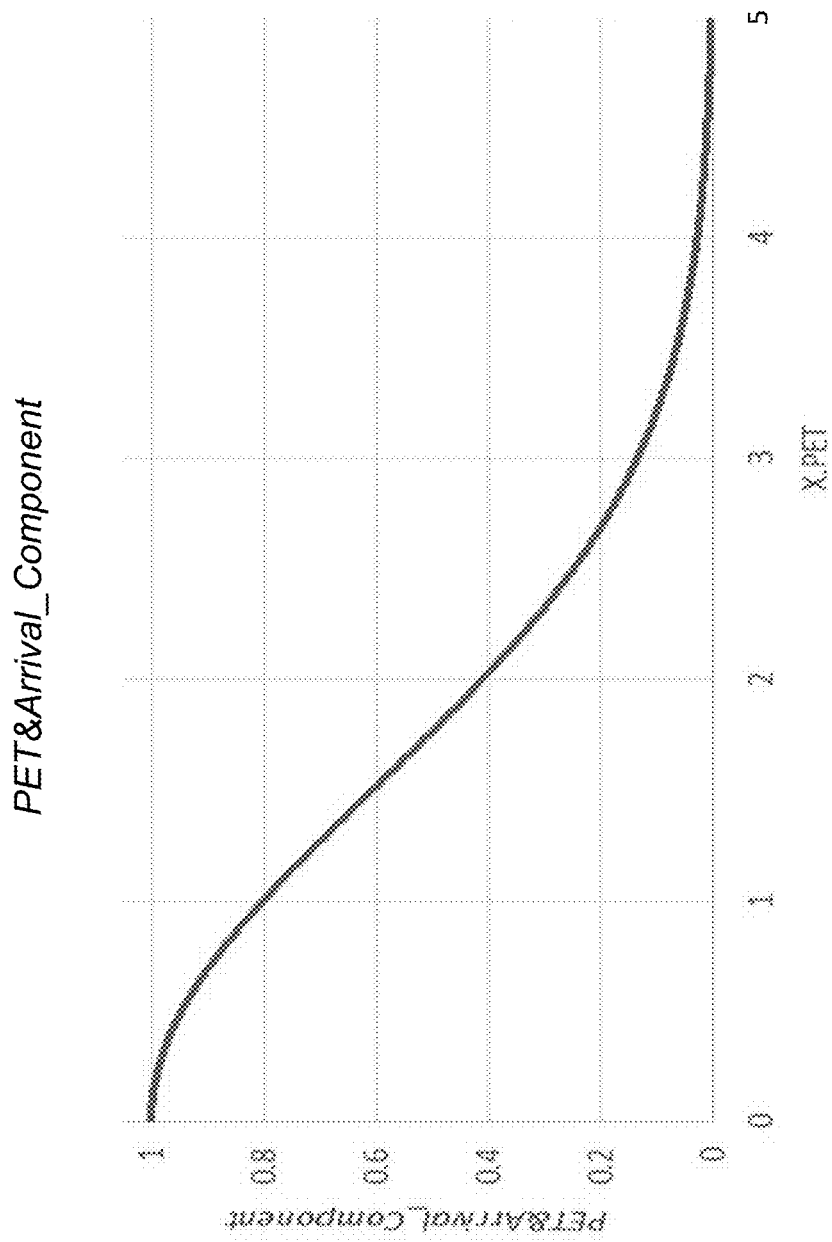
FIG. 6 shows a diagram of a PET and Arrival Component, according to one example.

FIG. 6 shows a diagram of the "PET and Arrival Component". In FIG. 6, the PET&Arrival_Component follows a normal distribution:

$$PET \,\&\, Arrival\_Component = \sqrt{2\pi\sigma_1^2} \cdot Norm(X \cdot PET) = e^{-\frac{X^2 \cdot PET^2}{2\sigma_1^2}}$$

Figure 7:
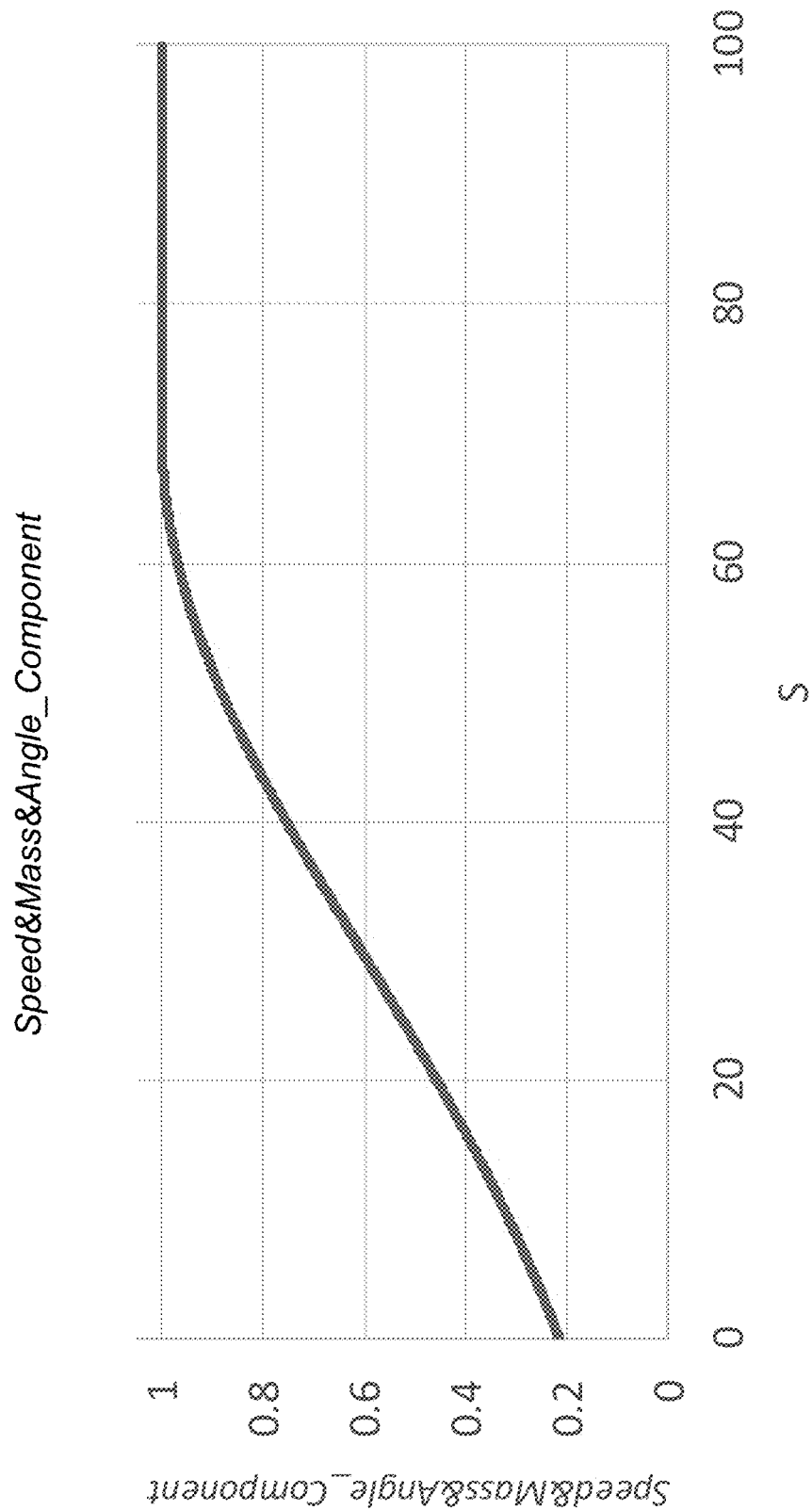
FIG. 7 shows a Speed, Mass and Angle Component diagram, according to one example.

Referring to FIG. 7, there is shown a "Speed, Mass and Angle Component" diagram. In FIG. 7, $$\Delta V_{max} = \frac{Max(m_1 + m_2)}{m_1 + m_2}\sqrt{v_1^2 + v_2^2 - 2v_1 v_2 \cos \alpha}$$

Where:
$v_1$ and $v_2$ are the speed values of the two road users at the time of conflict and a is the angle between the two road user movements' collision path
$m_1$ and $m_2$ are the masses of the two road users $\Delta V_{max}$ denotes the maximum expected change in velocity of the two road users in the case of an impact between them.

For example, we assign $S=\min(\Delta V_{max}, \mu_2)$. for example, we assume that above a threshold ($\mu_2$), $\Delta V_{max}$ will have the same effect (maximum effect) as the threshold and will not increase the severity of the conflict. Then, $$\text{Speed \& Mass \& Angle\_Component} = \sqrt{2\pi\sigma_2^2} \cdot \text{Norm}(S) = e^{-\frac{(S-\mu_2)^2}{2\sigma_2^2}}$$

Then, a risk value for a conflict between two road users can be determined as:

$$\text{Risk} = 100 * PET \text{ \& Arrival\_Component} * \text{Speed \& Mass \& Angle\_Component}$$

$$\text{Risk} = 100 * e^{-\frac{\sigma_2^2 \cdot X^2 \cdot PET^2 + \sigma_1^2(S-\mu_2)^2}{2\sigma_1^2\sigma_2^2}}$$

Figure 8:
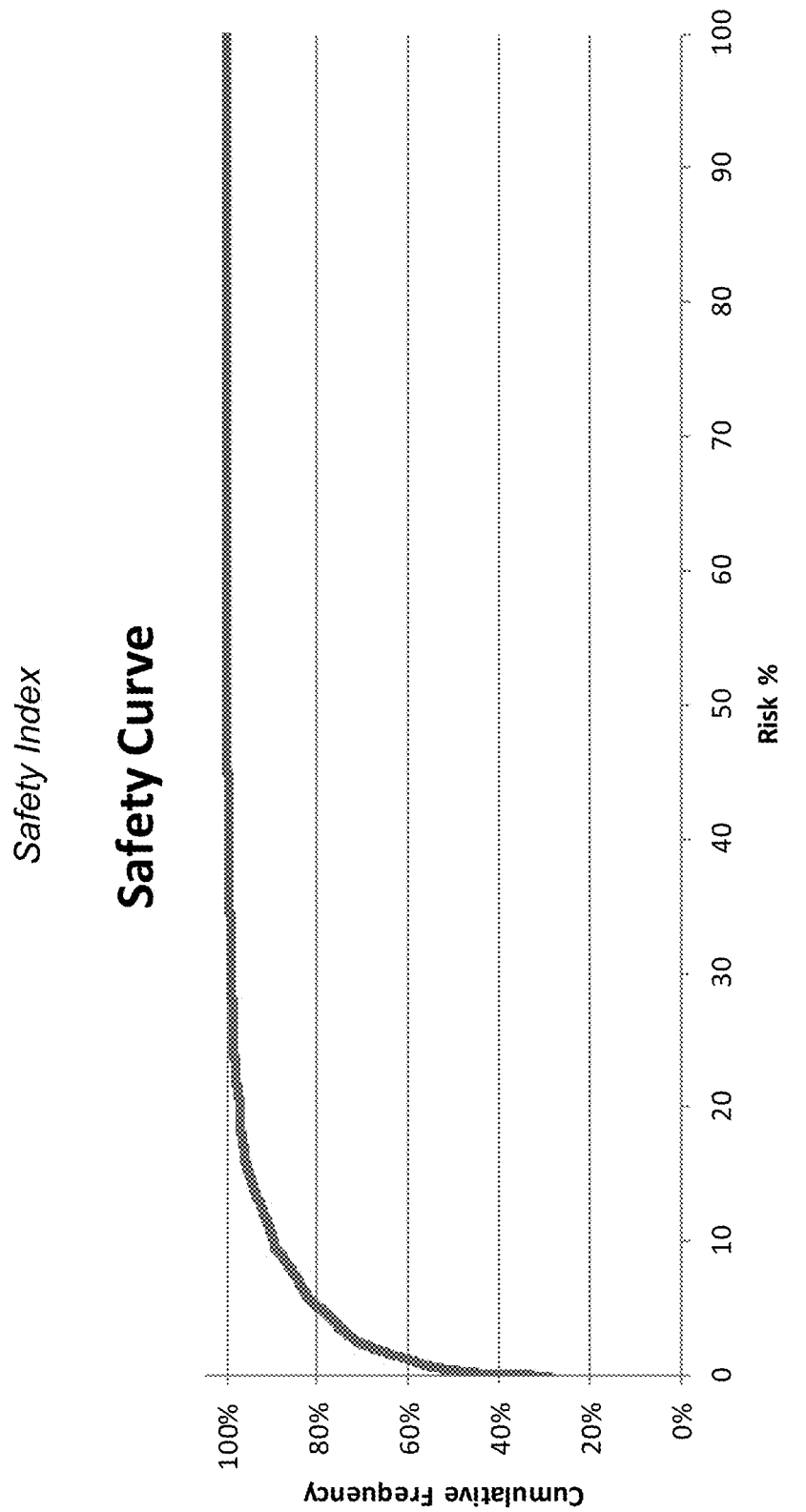
FIG. 8 shows a Safety Curve, according to one example.

Referring to FIG. 8, there is shown a risk % diagram, showing a safety curve. Each interaction between two road users has a risk value. By plotting the cumulative distribution of the risk values for all the interactions, a "safety curve" can be generated. A "safety index" is defined as the area under the safety curve and above 0%. A "risk index" is defined as the area above the safety curve and below 100%. The relation between "safety index" and "risk index" is:

risk index=100−safety index

The use of safety index and risk index is interchangeable. For example, a safety index of 94% means risk index of 6%.

For example, safety curve can be determined at scenario level or at location level. To assess the safety of a scenario, only the interactions within that scenario will be used to determine the safety curve, safety index and risk index. To assess the safety of a location (that includes multiple scenarios), all the interactions within that location will be used to determine the safety curve, safety index and risk index.

Determining a safety index for a scenario (for example, right turning vehicles and pedestrians at an intersection) can help assess collision risk between the two road user movements involved in the scenario.

Determining a safety index for a location (such as a road segment, intersection, roundabout, etc) can help assess overall collision risk between all road user movements in that location.

For example, the safety curve and safety index can be used by consulting firms and engineers to recommend interventions at locations with low level of safety for road users.

Safety index at both scenario level and location level can provide a powerful and informative tool to identify dangerous scenarios and locations and improve road users' safety. For example, a safety index can be used to identify intersections, corridors, or other urban areas that exhibit elevated collision risks to pedestrians.

Safety index can be used to compare safety level for different locations (for example to compare the safety level of location "a" against location "b") or to compare safety level of the same location for different time periods (for example to compare the safety level for a time period before an intervention at an intersection against the safety level for a time period after the intervention at the intersection).

For example, a scenario with safety index of 95% is safer than a scenario with safety index of 92%.

For example, a location with overall safety index of 95% is safer than a location with overall safety index of 92%.

For example, for a before-after study involving an intervention, if the safety index increases from before study to the after study, the intervention made the location safer. For example, the intervention can be a change in signal timing or change in design of an intersection.

For example, safety index can be used in simulation software to compare the safety level of different road designs or signal timings.

For example, the correlation between safety index and frequency and severity of historical crashes can be determined to be able to predict frequency and severity of the crashes in the future.

While the above description provides examples of one or more apparatus, methods, or systems, it will be appreciated that other apparatus, methods, or systems may be within the scope of the claims as interpreted by one of skill in the art.

The invention claimed is:

1. An apparatus for detecting, classifying and tracking road users on a set of frames of a video data, comprising:
    an object detection unit that
        identifies an object in a frame of the video data, wherein the object is identified by finding an identifier associated with the object in the frame, and
        determines a class to which the object belongs to among a plurality of predetermined classes;
    a tracking unit that matches the object to a corresponding object in at least one further frame of the video data as a sequence of matched objects, such that a path of the sequence of matched objects is tracked throughout the set of frames of the video data; and
    a scenario unit that determines where the path intersects a further path of a further sequence of matched objects in the set of frames of the video data and determines a risk indicator of a collision between the object associated with the sequence of matched objects and a further object associated with the further sequence of matched objects, and
    wherein the risk indicator is based on an arrival order of the sequence of matched objects and further sequence of matched objects to a zone where the path intersects the further path, with the risk indicator indicating a higher order-related risk if a one of the object and the further object that arrives at the zone first is of a more vulnerable class than the other of the object and the further object.

2. The apparatus of claim 1 further comprising a filtering unit that removes noise and removes the sequence of matched objects if the sequence of matched objects has a movement that is less than a predetermined threshold.

3. The apparatus of claim 1, wherein the zone is a spatial zone in the set of frames where the sequence of matched objects and the further sequence of matched objects arrive to a common point in the set of frames within a predetermined time of each other.

4. The apparatus of claim 3, wherein the scenario unit determines a conflict point where the sequence of matched objects and the further sequence of matched objects collide in the spatial zone.

5. The apparatus of claim 1, wherein the risk indicator is further based on:
    a speed of the object and a further speed of the further object, with the risk indicator indicating a higher speed-related risk as the speed or the further speed increases.

6. The apparatus of claim 1, wherein the scenario unit determines a safety indicator, wherein the safety indicator is a function of the risk indicator.

7. The apparatus of claim 6, wherein the safety indicator comprises a safety curve that represents a cumulative distribution of the risk indicator for a scenario or for a location.

8. The apparatus of claim 1 wherein the plurality of predetermined classes comprises at least one of a pedestrian class, a cyclist class, a motorcyclist class, a car class, a bus class, a truck class, and a motorized-vehicle class.

9. The apparatus of claim 1, wherein the risk indicator is further based on an estimated mass difference between the object and the further object, with the risk indicator indicating a higher mass-related risk as the estimated mass difference increases.

10. The apparatus of claim 1, wherein the risk indicator is further based on an angle between the path and the further path, with the risk indicator indicating a higher angle-related risk as the angle increases toward 180 degrees.

11. The apparatus of claim 1, further comprising a pre-filtering unit that determines whether the identifier associated to the object corresponds to a separate duplicate identifier associated to the object in the frame of the video data when the identifier overlap and removes the separate duplicate identifier.

12. A method for detecting, classifying and tracking objects on a set of frames of a video data, comprising:
   identifying an object in a frame of the video data by finding an identifier associated with the object in the frame;
   determining a class to which the object belongs among a plurality of predetermined classes;
   matching the object to a corresponding object in at least one further frame of the video data as a sequence of matched objects, such that a path of the sequence of matched objects is tracked throughout the set of frames of the video data;
   determining where the path intersects a further path of a further sequence of matched objects in the set of frames of the video data; and
   determining a risk indicator of a collision between the object associated with the sequence of matched objects and a further object associated with the further sequence of matched objects, and wherein the risk indicator is based on an arrival order of the sequence of matched objects and the further sequence of matched objects to a zone where the path intersects the further path, with the risk indicator indicating a higher order-related risk if a one of the object and the further object that arrives at the zone first is of a more vulnerable class than the other of the object and the further object.

13. The method of claim 12 further comprising removing noise and removing the sequence of matched objects if the sequence of matched objects has a movement that is less than a predetermined threshold.

14. The method of claim 12, wherein the zone is a spatial zone in the set of frames of the video data where the sequence of matched objects and the further sequence of matched objects arrive to a common point in the set of frames within a predetermined time of each other.

15. The method of claim 12, wherein the risk indicator is further based on:
   a speed of the object and a further speed of the further object, with the risk indicator indicating a higher speed-related risk as the speed or the further speed increases.

16. The method of claim 12, further comprising determining a safety indicator, wherein the safety indicator is a function of the risk indicator.

17. The method of claim 16, wherein the safety indicator comprises a safety curve that represents a cumulative distribution of the risk indicator for a scenario or for a location.

18. The method of claim 12, wherein the risk indicator is further based on an estimated mass difference between the object and the further object, with the risk indicator indicating a higher mass-related risk as the estimated mass difference increases.

19. The method of claim 12, wherein the risk indicator is further based on an angle between the path and the further path, with the risk indicator indicating a higher angle-related risk as the angle increases towards 180 degrees.

20. The method of claim 12, further comprising determining whether the identifier associated to the object corresponds to a separate duplicate identifier associated to the object in the frame of the video data when the identifiers overlap and removing the separate duplicate identifier.

* * * * *